(12) United States Patent
Neilson et al.

(10) Patent No.: US 6,757,458 B2
(45) Date of Patent: Jun. 29, 2004

(54) OPTICAL MEMS SWITCH WITH CONVERGING BEAMS

(75) Inventors: David Thomas Neilson, Old Bridge, NJ (US); Roland Ryf, Aberdeen, NJ (US)

(73) Assignees: Lucent Technologies Inc., Murray Hill, NJ (US); Agere Systems, Inc., Allentown, PA (US)

( * ) Notice: Subject to any disclaimer, the term of this patent is extended or adjusted under 35 U.S.C. 154(b) by 59 days.

(21) Appl. No.: 09/896,339

(22) Filed: Jun. 29, 2001

(65) Prior Publication Data

US 2003/0002783 A1 Jan. 2, 2003

(51) Int. Cl.⁷ .............................. G02B 6/35; G02B 6/32
(52) U.S. Cl. ........................................... 385/18; 385/33
(58) Field of Search .................................... 385/18, 33

(56) References Cited

U.S. PATENT DOCUMENTS

| | | | | |
|---|---|---|---|---|
| 6,097,859 A | * | 8/2000 | Solgaard et al. | 385/17 |
| 6,330,102 B1 | * | 12/2001 | Daneman et al. | 359/290 |
| 6,347,167 B1 | * | 2/2002 | Hagelin | 385/18 |
| 6,445,844 B1 | * | 9/2002 | Neukermans et al. | 385/18 |

FOREIGN PATENT DOCUMENTS

| | | | |
|---|---|---|---|
| DE | 295 17 012 U | 2/1996 | G02B/26/35 |
| DE | 296 18 818 U | 1/1997 | G02B/26/35 |
| EP | 0 153 243 A | 8/1985 | G02B/26/28 |
| WO | 01 95007 A | 12/2001 | G02B/26/02 |

* cited by examiner

*Primary Examiner*—Hemang Sanghavi
*Assistant Examiner*—Mike Stahl
(74) *Attorney, Agent, or Firm*—Eugene J. Rosenthal

(57) ABSTRACT

The beams between a MEMS device and an input source or an output, e.g., a fiber bundle, are caused to be closer to each other at the MEMS device than at the fiber bundle. This can be achieved in a variety ways. This may be achieved a) when each fiber is associated with a respective micro lens of a micro lens array, by insuring that there is a different distance between the centers of adjacent micro lenses than there is for the centers of their corresponding adjacent fibers, b) when the fibers are terminated by collimators, the direction of the collimators is adjusted to point the beams in a converging manner and c) by employing an optical system that changes the direction of various ones of the beams may be interposed between a) the fiber bundle and b) the corresponding MEMS device.

8 Claims, 5 Drawing Sheets

OPTICAL MEMS SWITCH WITH CONVERGING BEAMS

TECHNICAL FIELD

This invention relates to the art of optical microelectromechanical systems (MEMS) devices, and more particularly, to all-optical switching using MEMS devices.

BACKGROUND OF THE INVENTION

One solution for all-optical switching employs two MEMS devices each containing an array of tiltable micro mirrors, e.g., small mirrors, which can reflect light, which herein refers to any radiation in the wavelength of interest, whether or not in the visible spectrum. An optical path is established for light supplied from an input source, e.g., an optical fiber, to an output, e.g., an output fiber, by steering the light using a first micro mirror on the first optical MEMS device, the first micro mirror being associated with the input fiber, onto a second micro mirror on the second optical MEMS device which is associated with the output fiber. The second micro mirror then steers the light into the output fiber. Each fiber connected to the system is considered a port of the system, the input fibers being the input ports and the output fibers being the output ports.

Often, the light to be steered from the input fiber onto the first micro mirror of the first optical MEMS device first passes through a micro lens that is associated therewith and is part of an input micro lens array. The function of each micro lens is to collimate the beam of light supplied from its respective associated input fiber. Alternatively, in lieu of employing a separate micro lens array, a lens may be integrated with each fiber of fiber bundle in an arrangement that forms a collimator. A similar arrangement of a micro lens array or collimators are also found interposed between the output MEMS device and the output fiber bundle in the output section of the all-optical switch. In the output section, the function of each micro lens is to couple the light beam into its respective associated output fiber.

At present, the tilt angle of a micro mirror is set by applying to one or more electrodes appropriate voltages. Unfortunately, using current electrostatic angle control technology, the tilt resulting for a particular control voltage is a highly non-linear function. Consequently, requiring less tilt tends to allow the angle desired to be more accurately achieved. As a result, all-optical switches tend to include the functionality of a so-called "field lens" between the MEMS devices. The field lens causes beams reflected from untilted mirrors on a MEMS device to converge. This acts to translates the angle at which the light is incident onto each micro mirror into a position to which the light will be directed upon reflection from the micro mirror, thereby allowing all the input micro mirrors to be homogenized. By homogenized it is meant that all micro mirrors having the same tilt will direct their light to the same position. Furthermore, the field lens refocuses each of the beams that pass through it, thus reducing loss. However, use of the field lens does not decrease the distance that is required between the input and output MEMS devices.

Because the all-optical switch is typically made up of sets of mirrors that cooperate to switch light from any input port to any output port, the entire system needs to be aligned to achieve the best possible optical connections, i.e., the least loss from the input to the output. To this end it must be determined what voltages need be applied to the electrodes controlling each mirror to achieve the best connection between it and each other mirror of the opposing set, and what voltage needs to be applied to the electrodes of each of the opposing mirrors as well. This process of determining the voltages is known as "training". When a field lens is used, the entire optical switch must be trained as a unit because there are variations from one system to the next due to variations in the respective field lenses and in the mounting position. This training process is time consuming and must be repeated should any component need to be replaced.

SUMMARY OF THE INVENTION

We have recognized that the field lens can be eliminated, while the same effect as if a field lens had been included in the system is maintained by, in accordance with the principles of the invention, causing the beams between a MEMS device and an input source or an output, e.g., a fiber bundle, to be closer to each other at the MEMS device than at the fiber bundle. This can be achieved in a variety ways. In one embodiment of the invention in which each fiber is associated with a respective micro lens of a micro lens array, by insuring that there is a different distance between the centers of adjacent micro lenses than there is for the centers of their corresponding adjacent fibers. In another embodiment of the invention in which the fibers are terminated by collimators, the direction of the collimators can be adjusted to point the beams in a converging manner. In yet another embodiment of the invention, an optical system that changes the direction of various ones of the beams may be interposed between a) the fiber bundle, and any associated micro lens array or collimators, and b) the corresponding MEMS device. Such an optical system could be any focusing lens arrangement, a multiple prism arrangement, and a multiple mirror arrangement where each mirror is tilted to point the beams in a converging manner. Furthermore, the optical system could be combined with an imaging system to image the micro lenses or collimators onto the MEMS device.

DETAILED DESCRIPTION

Figure 1:
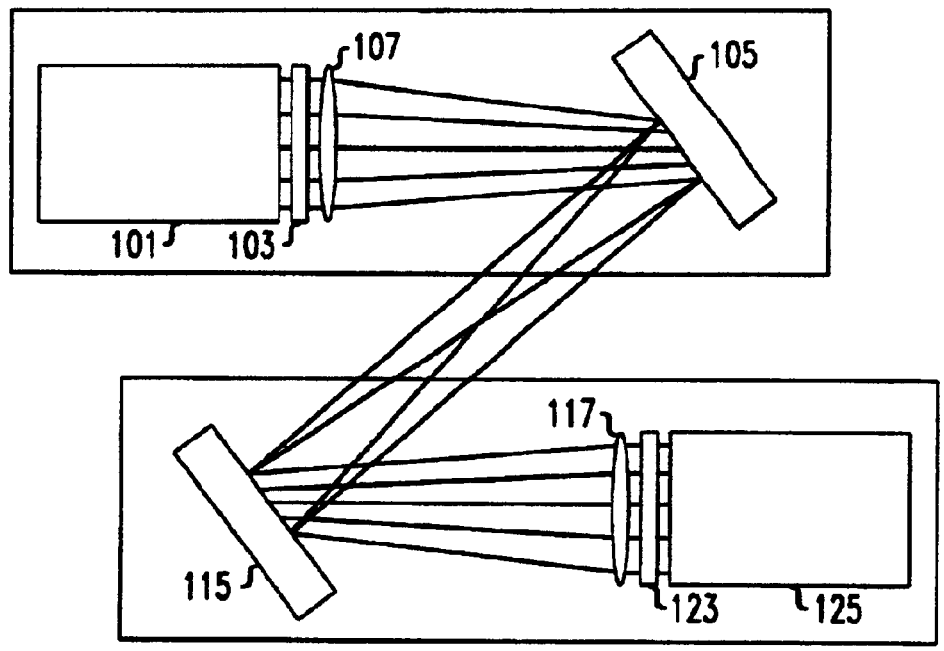
FIG. 1 shows an exemplary arrangement for performing optical switching in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGS., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Software modules, or simply modules which are implied to be software, may be represented herein as any combination of flowchart elements or other elements indicating performance of process steps and/or textual description. Such modules may be executed by hardware which is expressly or implicitly shown.

Unless otherwise explicitly specified herein, the drawings are not drawn to scale.

Additionally, unless otherwise explicitly specified herein, any lens shown and/or described herein is actually an optical system having the particular specified properties of that lens. Such an optical system may be implemented by a single lens element but is not necessarily limited thereto. Similarly, where a mirror is shown and/or described what is actually being shown and/or described is an optical system with the specified properties of such a mirror, which may be implemented by a single mirror element but is not necessarily limited to a single mirror element. This is because, as is well known in the art, various optical systems may provide the same functionality of a single lens element or mirror but in a superior way, e.g., with less distortion. Furthermore, as is well known in the art, the functionality of a curved mirror may be realized via a combination of lenses and mirrors and vice versa. Moreover, any arrangement of optical components that are performing a specified function, e.g., an imaging system, gratings, coated elements, and prisms, may be replaced by any other arrangement of optical components that perform the same specified function. Thus, unless otherwise explicitly specified here, all optical elements or systems that are capable of providing specific function within an overall embodiment disclosed herein are equivalent to one another for purposes of the present disclosure.

The term micro-electromechanical systems (MEMS) device as used herein is intended to mean an entire MEMS device or any portion thereof. Thus, if a portion of a MEMS device is inoperative, or if a portion of a MEMS device is occluded, such a MEMS device is nonetheless considered to be a MEMS device for purposes of the present disclosure.

In the description, identically numbered components within different ones of the FIGS. refer to the same components.

FIG. 1 shows an exemplary arrangement for performing optical switching in accordance with the principles of the invention. Shown in FIG. 1 are a) input fiber bundle 101, b) input micro lens array 103, c) input MEMS device 105, d) output MEMS device 115, e) output micro lens array 123, f) output fiber bundle 125, and g) lenses 107 and 117.

Input fiber bundle 101 supplies optical signals to be switched. More specifically, each fiber of input fiber bundle 101 is an input port to the switching system of FIG. 1. The light supplied by each fiber of fiber bundle 101 passes through a respective corresponding micro lens that is part of micro lens array 103. The function of each micro lens is to collimate the beam of light supplied from its respective associated input fiber. In alternative embodiments of the invention, in lieu of employing a separate micro lens array, a lens may be integrated with each fiber of fiber bundle 101 in an arrangement that forms a collimator, so that the light comes out as a parallel beam.

In accordance with the principles of the invention, the beams of light passing from micro lens array 103 each falls upon lens 107 which is arranged to cause the beams from the micro lens array and/or the collimators to converge. Thus, the beams will no longer be parallel and any beam not through the center of lens 107 will have a change in direction. Those beams below the lens center will be bent to travel up while those beams above the lens center will be bent to travel down. In one embodiment of the invention, the optical path of the all-optical switch is such that the focal point of lens 107 lies on output MEMS device 115.

Each micro mirror of input MEMS device 105 is set to reflect the beam of light incident on it at a respective prescribed angle. The particular prescribed angle is selected so that the beam will be directed to a prescribed micro mirror on output MEMS device 115 that corresponds to the particular fiber of output fiber bundle 125 to which the light is being directed as an output.

After reflecting off of its particular micro mirror of input MEMS device 105, each beam of light falls upon a respective micro mirror of output MEMS device 115. Each micro mirror of output MEMS device 115 is set to reflect the beam of light incident on it at a respective prescribed angle. The particular prescribed angle is selected so that each light beam will be directed towards the respective fiber of output fiber bundle 125 which is to be the output fiber for the light beam after it passes through lens 117.

After reflecting off of its particular micro mirror of output MEMS device 115 and prior to reaching its respective output fiber, each beam of light passes through lens 117, which is arranged so as to cause the beams from the micro lens array and/or the collimators to diverge so that when they emerge from lens 117 they are substantially parallel. Thus, the beams will become again substantially parallel, or at least they will diverge less, and any beam not through the center of lens 117 will have a change in direction. In one embodiment of the invention, the optical path of the all-optical switch is such that the focal point of lens 117 lies on input MEMS device 105.

The beams of light passing from lens 117 passes through a respective micro lens of micro lens array 123. The function of each micro lens is to collimate the beam of light supplied to its respective associated input fiber. In alternative embodiments of the invention, in lieu of employing a separate micro lens array, a lens may be integrated onto each output fiber of fiber bundle 125, thus forming a collimator. The light from each of micro lens of micro lens array 123 then passes into the respective output fiber bundle that is associated with the micro lens.

Note that in lieu of lens 107 and/or lens 117 any other optical system that changes the direction of the beams individually may be employed, e.g., any focusing lens arrangement, a multiple prism arrangement, a multiple mirror arrangement where each mirror is tilted so as to point the beams in a converging manner, or the like.

Figure 2:
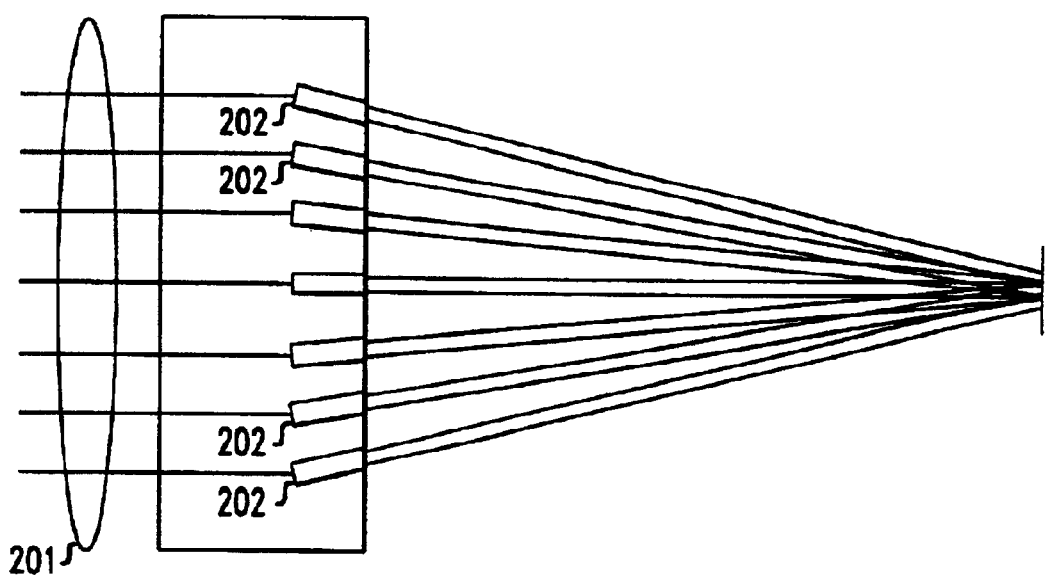
FIG. 2 shows another arrangement, in accordance with an aspect of the invention, for causing the beams to converge, or which is able to receive diverging beams, in an all-optical switch.

FIG. 2 shows another arrangement, in accordance with an aspect of the invention, for causing the beams to converge, or which is able to receive diverging beams, in an all-optical switch. In the arrangement of FIG. 2 the fibers of fiber bundle 201 are terminated by collimators 202, and the direction of collimators 202 are adjusted to point the beams in a converging manner. Similarly, in the reverse direction, due their pointed arrangement, collimators 202 may receive beams of light that are diverging and couple the beams into their respective associated fibers. As indicated above, since collimators 202 are employed, there is no need to use micro lens array 103 or 123. The arrangement of FIG. 2 may be used in lieu of either fiber bundle 101, micro lens array 103 and lens 107 or fiber bundle 125, micro lens array 123 and lens 117. The degree of convergence is determined by the implementer.

Figure 3:
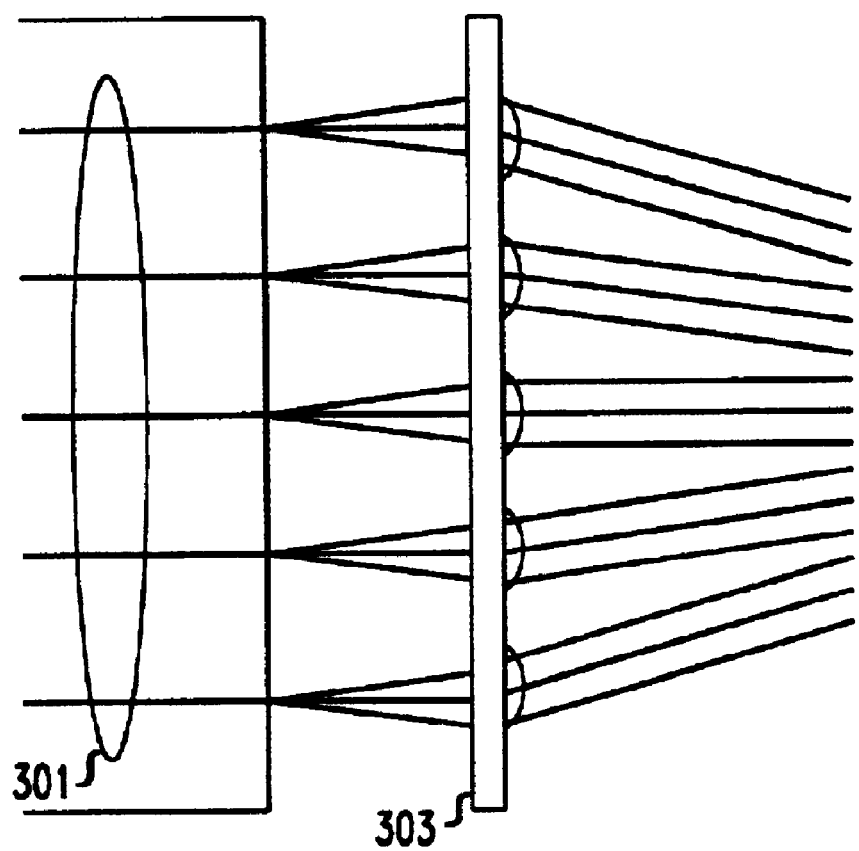
FIG. 3 shows yet another arrangement, in accordance with an aspect of the invention, for causing the beams to converge, or which is able to receive diverging beams, in an all-optical switch.

FIG. 3 shows yet another arrangement, in accordance with an aspect of the invention, for causing the beams to converge, or which is able to receive diverging beams, in an all-optical switch. In the arrangement of FIG. 3, each fiber of fiber bundle 301 is associated with a respective micro lens of micro lens array 303 and there is a different distance between the centers of adjacent micro lenses than there is for the centers of their corresponding adjacent fibers. This arrangement produces converging beams. Similarly, in the reverse direction beams of light that are diverging may be coupled into their respective associated fibers. Thus, the arrangement of FIG. 3 may be used in lieu of either fiber bundle 101, micro lens array 103 and lens 107 or fiber bundle 125, micro lens array 123 and lens 117. The degree of convergence is determined by the implementer.

Figure 4:
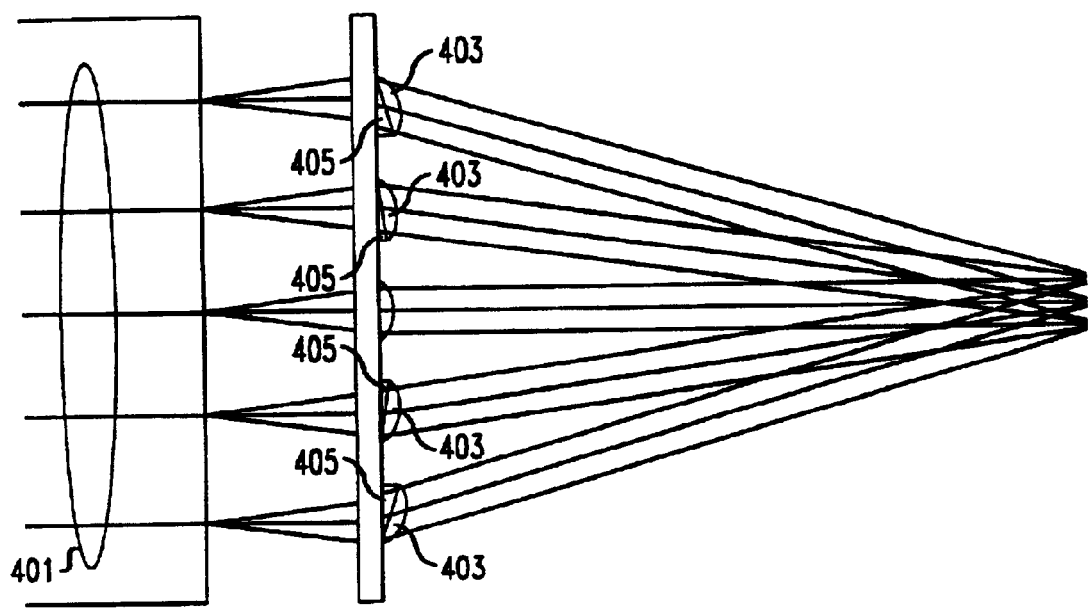
FIG. 4 shows a further arrangement, in accordance with an aspect of the invention, for causing the beams to converge, or which is able to receive diverging beams, in an all-optical switch.

FIG. 4 shows a further arrangement, in accordance with an aspect of the invention, for causing the beams to converge, or which is able to receive diverging beams, in an all-optical switch. In the arrangement of FIG. 4, a micro prism 405, which may be part of a micro prism array, is associated with each fiber of fiber bundle 401. Each associated fiber and micro prism are further associated with a respective micro lens of micro lens array 403. Light beam from each of fiber of fiber bundle 401 is redirected by the fiber's associated micro prism 405 to be converging with other light beams from the other fibers of fiber bundle 401, and the associated micro lens array 403 collimates the beam. The order in the optical path of the micro prism and the micro lens is not material. The tilt of each prism should be different so as to converging beams. Similarly, in the reverse direction beams of light that are diverging may be coupled into their respective associated fibers. Thus, the arrangement of FIG. 4 may be used in lieu of either fiber bundle 101, micro lens array 103 and lens 107 or fiber bundle 125, micro lens array 123 and lens 117. The degree of convergence is determined by the implementer.

Figure 5:
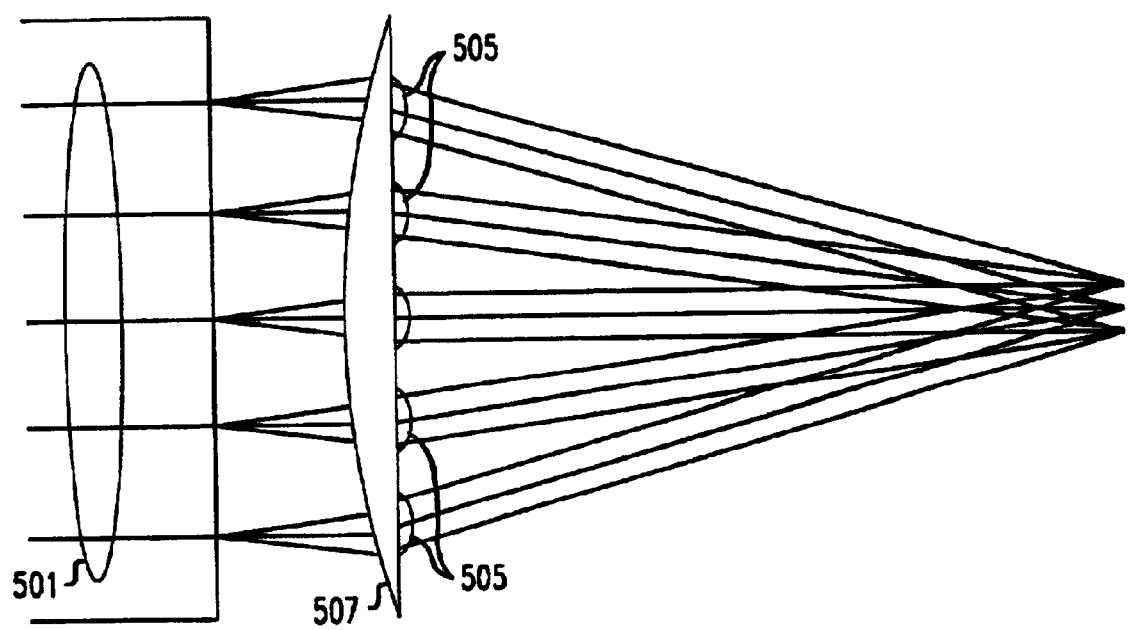
FIG. 5 shows yet another arrangement, in accordance with an aspect of the invention, for causing the beams to converge, or which is able to receive diverging beams, in an all-optical switch.

FIG. 5 shows yet another arrangement, in accordance with an aspect of the invention, for causing the beams to converge, or which is able to receive diverging beams, in an all-optical switch. In the arrangement of FIG. 5, the micro lens array, e.g., micro lens array 103 or 123 of FIG. 1 is integrated with its respective associated one of lens 107 and 117. The order in the optical path of the lens and the micro lens array, or even individual lenses of the micro lens array, is not material. Thus, shown in FIG. 5 is fiber bundle 501 along with lens 507 on which has been integrated micro lenses 505. This arrangement produces converging beams. Similarly, in the reverse direction beams of light that are diverging may be coupled into their respective associated fibers. The degree of convergence is determined by the implementer.

Figure 6:
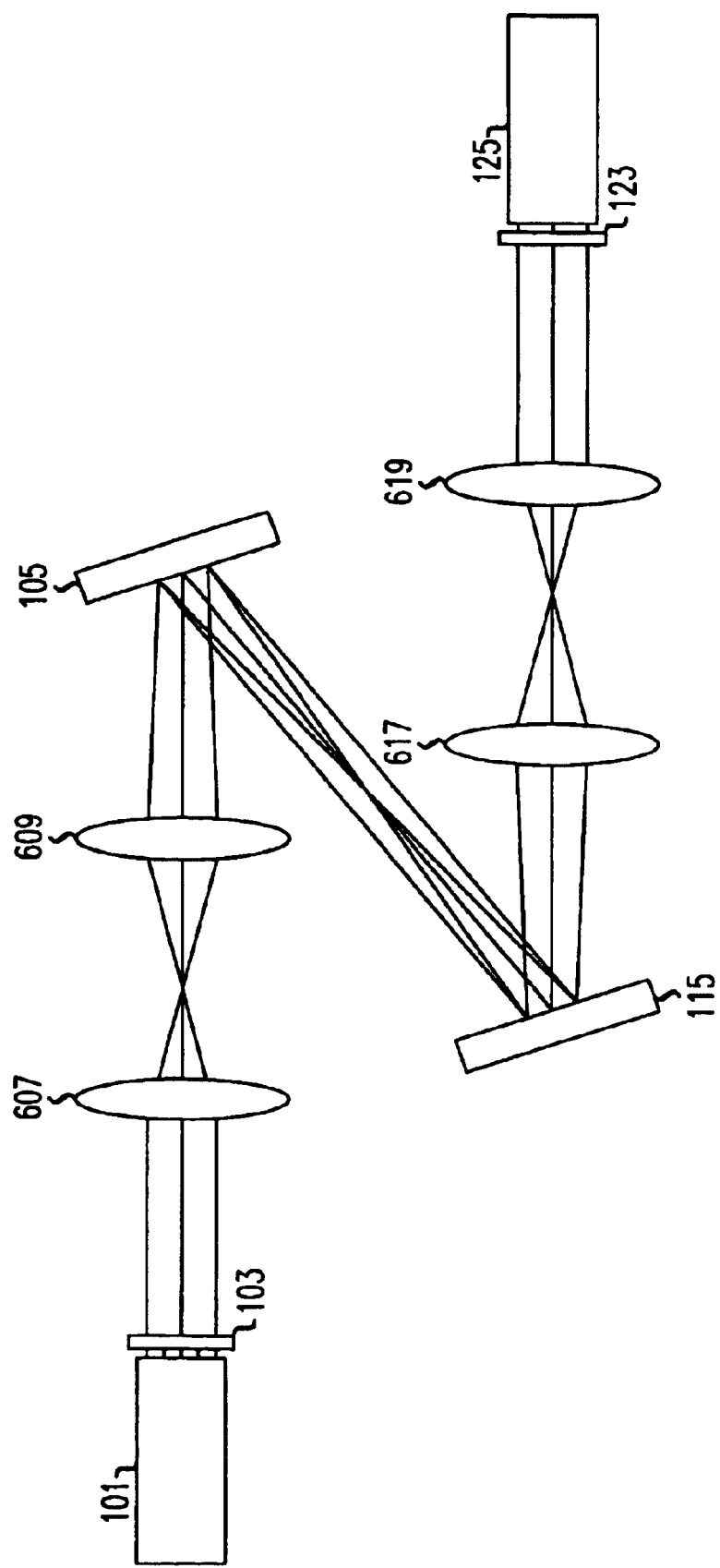
FIG. 6 shows an exemplary arrangement for performing optical switching that employs an imaging system interposed between the MEMS device and a fiber bundle to image the fiber bundle on the MEMS device and to make the beams converging at the input or diverging at the output, in accordance with the principles of the invention

FIG. 6 shows an exemplary arrangement for performing optical switching that employs an imaging system interposed between the MEMS device and a fiber bundle to image the fiber bundle on the MEMS device and to make the beams converging at the input or diverging at the output, in accordance with the principles of the invention. Shown in FIG. 6 are a) input fiber bundle 101, b) input micro lens array 103, c) input MEMS device 105, d) lens 607, e) lens 609, f) output MEMS device 115, g) lens 617, h) lens 619, i) output micro lens array 123, and j) output fiber bundle 125.

Input fiber bundle 101 supplies optical signals to be switched. More specifically, each fiber of input fiber bundle 101 is an input port to the switching system of FIG. 1. The light supplied by each fiber of fiber bundle 101 passes through a respective corresponding micro lens that is part of micro lens array 103. The function of each micro lens is to collimate the beam of light supplied from its respective associated input fiber. In alternative embodiments of the invention, in lieu of employing a separate micro lens array, a lens may be integrated with each fiber of fiber bundle 101 in an arrangement that forms a collimator, so that the light comes out as a parallel beam.

In accordance with the principles of the invention, the beams of light passing from micro lens array 103 each falls upon the imaging system made up of lenses 607 and 609, entering at lens 607 and exiting at lens 609. The imaging system is arranged so as to cause an image of the micro lens array and/or the collimators to be formed at input MEMS device 105, or vice-versa, due to the reversible nature of optics, thus effectively eliminating the distance between micro lens array and/or collimators 103 and input MEMS device 105 over which the light beams had effectively traveled in prior art arrangements. The imaging system is further arranged, in accordance with the principles of the invention, to cause the beams of light from each input fiber to be converging when they are incident on MEMS device 105 regardless of their original orientation when exiting fiber bundle 101. Thus, advantageously, each light beam, even if not traveling initially in its intended direction due to errors in the fiber-micro lens alignment does not get the opportunity to travel away from its intended target and furthermore, the light beams are oriented so as to be converging.

Note that although two lenses are shown making up the imaging system, this is for pedagogical and clarity purposes only. Those of ordinary skill in the art will readily appreciate that any imaging system, e.g., a system using one or more lenses, may be employed. Also note that since the imaging system may be inverting the respective corresponding micro mirrors of input MEMS device 105 may not be in the exact same location, e.g., on a direct line from input fiber bundle 101 as they would have been had the imaging system not been employed.

The imaging system may also change the size of the image as compared with the original. This would allow the micro mirrors of input MEMS device 105 to have a different size and/or spacing than that of micro lens array and/or collimators 103. It would also allow the use of a fiber bundle without a micro lens array and/or collimators if the fill factor, i.e., the ratio between the spot size and the distance between the spots, between the fiber bundle and the micro mirrors of the MEMS device is substantially maintained. Furthermore, it is possible to employ optical splitters, e.g., between lenses 607 and 609, to create multiple signal paths through the system, e.g., to implement a multicast, broadcast, monitoring, protection and restoration functions. Advantageously, great flexibility in system design is achieved.

Each micro mirror of input MEMS device 105 is set to reflect the beam of light incident on it at a respective prescribed angle. The particular prescribed angle is selected so that the beam will be directed to a prescribed micro mirror on output MEMS device 115 that corresponds to the particular fiber of output fiber bundle 125 to which the light is being directed as an output. Any error that results from the light having entered the imaging system traveling along a direction that is not parallel to the line formed by the center of its lens or collimator and its associated micro mirror is compensated for by the "training" of the all-optical system so long as deviation angle of the light from the parallel is small compared to the maximum angle at which the mirror can be tilted. "Training" is the process of determining what voltages need be applied to the electrodes each mirror to achieve necessary tilt that provides the best connection between it and each other mirror of the opposing set, and what voltage needs to be applied to the electrodes of each of the opposing mirrors as well.

After reflecting off of its particular micro mirror of input MEMS device 105, each beam of light falls upon a respective micro mirror of output MEMS device 115. Each micro mirror of output MEMS device 115 is set to reflect the beam of light incident on it at a respective prescribed angle. The particular prescribed angle is selected so that each light beam will be directed towards the respective fiber of output fiber bundle 125 which is to be the output fiber for the light beam.

After reflecting off of its particular micro mirror of output MEMS device 115 and prior to reaching its respective output fiber, each beam of light passes through lens 617 and then lens 619, which together form an imaging system. The imaging system is arranged so as to cause an image of output MEMS device 115 and/or the collimators to be formed at output micro lens array 123 and/or collimators 123, or vice-versa, due to the reversible nature of optics, thus effectively eliminating the distance between output MEMS device 115 and micro lens array and/or collimators 123 over which the light beams had effectively traveled in prior art arrangements. The imaging system is further arranged, in accordance with the principles of the invention, to cause the beams of light from output MEMS device 115 to be diverging when they are incident on micro lens array 123 regardless of their original orientation when they were reflected off of MEMS device 115. Thus, advantageously, each light beam, even if not traveling in the desired direction due to errors in alignment does not get the opportunity to travel away from its intended target and furthermore, the light beams are oriented so as to be diverging.

As previously indicated in connection with the lens of the input imaging system, although two lenses are shown making up the output imaging system, this is for pedagogical and clarity purposes only. Those of ordinary skill in the art will readily appreciate that any imaging system, e.g., a system using one or more lenses, may be employed.

Note that the imaging system may also change the size of the image as compared with the original. This would allow the micro mirrors of output MEMS device 115 to have a different size and/or spacing than that of micro lens array and/or collimators 123. It would also allow the use of a fiber bundle without a micro lens array and/or collimators if the fill factor, i.e., the ratio between the spot size and the distance between the spots, between the fiber bundle and the micro mirrors of the MEMS device is substantially maintained. Furthermore, it is possible to employ optical splitters, e.g., between lenses 617 and 619, to create multiple signal paths through the system, e.g., to implement a multicast, broadcast, monitoring, protection and restoration functions. Advantageously, great flexibility in system design is achieved.

The beams of light passing from lens 619, which are now substantially parallel, or at least less diverging, pass through a respective micro lens of micro lens array 123. The function of each micro lens is to collimate the beam of light supplied to its respective associated input fiber. In alternative embodiments of the invention, in lieu of employing a separate micro lens array, a lens may be integrated onto each output fiber of fiber bundle 125, thus forming a collimator. The light from each of micro lens of micro lens array 123 then passes into the respective output fiber bundle that is associated with the micro lens.

Note that in some embodiments of the invention only one imaging system need be employed. In such embodiments the imaging system may be employed only for the input or only for the output.

Note, that in other embodiments of the invention the imaging system may be separate from the arrangement which causes the beams to converge/diverge.

The physical size of the arrangement may be reduced by compacting the optical path, e.g., using appropriate conventional mirrors, and/or employing folded arrangements, i.e., arrangements in which there is only one MEMS device stage that does double duty for both input and output through the use of at least one conventional mirror.

Note that instead of optical fibers supplying the light beams as inputs, they may be supplied by an optical source, e.g., a laser or light emitting diode, planar wave guides, or the like. Likewise, instead of having optical fibers receiving the light beams as outputs the light beams could be received by other receivers such as photo detectors, planar wave guides, or the like.

What is claimed is:

1. An optical apparatus, comprising
   a first micro-electromechanical system (MEMS) device; and
   a first bundle of a plurality of optical fibers;
   a micro lens array, said micro lens array having a plurality of micro lenses each of which is associated with one of said fibers;
   a lens system having at least one lens, said at least one lens being interposed between said MEMS device and said first bundle, said lens system being arranged so that light beams passing between said first MEMS device and said first bundle are closer to each other at said first MEMS device than at said first bundle, and so that said beams are not parallel at said first MEMS device and said beams are substantially parallel at said first bundle; and
   wherein said micro lens array is interposed along an optical path between said at least one lens and first MEMS device, whereby said micro lens array is separated from said fiber bundle by said at least one lens.

2. The invention as defined in claim 1 further comprising:
   a second micro-electromechanical system (MEMS) device;
   a second bundle of a plurality of fibers;
   said optical apparatus being arranged so that light beams passing between said second MEMS device and said second bundle are closer to each other at said second MEMS device than at said second bundle;
   said second MEMS device reflecting light coming from said first MEMS device.

3. The invention as defined in claim 1 further comprising:
   a second micro-electromechanical system (MEMS) device;
   a second bundle of a plurality of fibers;
   said optical apparatus being arranged so that light beams passing between said second MEMS device and said second bundle are parallel to each other;
   said second MEMS device reflecting light coming from said first MEMS device.

4. The invention as defined in claim 1 wherein at least a portion of said micro lens array is integrated with said lens system.

5. The invention as defined in claim 1 wherein said optical apparatus is arranged in compact form using at least one mirror.

6. The invention as defined in claim 1 wherein said optical apparatus is arranged in folded form using at least one mirror.

7. An optical apparatus, comprising
   a first micro-electromechanical system (MEMS) means; and
   a means for supplying a plurality of spatially separated optical signals;
   a micro lens array, said micro lens array having a plurality of micro lenses each of which is associated with one of said spatially separated optical signals; and
   a lens system having at least one lens, said at least one lens being interposed between said MEMS device and said means for supplying, said lens system being arranged so that light beams passing between said first MEMS means and said supplying means are closer to each other at said first MEMS device than at said supplying means; and
   wherein said micro lens array is interposed along an optical path between said at least one lens and first MEMS device, whereby said micro lens array is separated from said supplying means by said at least one lens.

8. An optical apparatus, comprising
   a first micro-electromechanical system (MEMS) means; and
   a means for receiving a plurality of spatially separated optical signals;
   a micro lens array, said micro lens array having a plurality of micro lenses each of which is associated with one of said spatially separated optical signals; and
   a lens system having at least one lens, said at least one lens being interposed between said MEMS device and said means for receiving, said lens system being arranged so that light beams passing between said first MEMS means and said receiving means are closer to each other at said first MEMS device than at said receiving means; and
   wherein said micro lens array is interposed along an optical path between said at least one lens and first MEMS device, whereby said micro lens array is separated from said receiving means by said at least one lens.

* * * * *